(12) United States Patent
Kaneumi et al.

(10) Patent No.: US 9,068,059 B2
(45) Date of Patent: *Jun. 30, 2015

(54) FLUORINE-CONTAINING POLYMER AQUEOUS DISPERSION

(75) Inventors: Yoshiyama Kaneumi, Ibaraki (JP); Daisuke Murai, Ibaraki (JP)

(73) Assignee: Unimatec Co., Ltd., Tokyo (JP)

( * ) Notice: Subject to any disclaimer, the term of this patent is extended or adjusted under 35 U.S.C. 154(b) by 143 days.

This patent is subject to a terminal disclaimer.

(21) Appl. No.: 13/699,807

(22) PCT Filed: May 13, 2011

(86) PCT No.: PCT/JP2011/061031
§ 371 (c)(1),
(2), (4) Date: Nov. 26, 2012

(87) PCT Pub. No.: WO2011/148795
PCT Pub. Date: Dec. 1, 2011

(65) Prior Publication Data
US 2013/0079466 A1 Mar. 28, 2013

(30) Foreign Application Priority Data
May 25, 2010 (JP) .................................. 2010-118951

(51) Int. Cl.
*C08K 5/5317* (2006.01)
*C08F 2/26* (2006.01)
*C08F 2/30* (2006.01)

(52) U.S. Cl.
CPC .................. *C08K 5/5317* (2013.01); *C08F 2/26* (2013.01); *C08F 2/30* (2013.01)

(58) Field of Classification Search
CPC .............. C08F 14/18; C08F 2/22; C08F 2/24; C08F 2/16; C08L 27/12; C08K 5/5317
USPC ........... 524/805; 526/206, 247, 249, 253, 254
See application file for complete search history.

(56) References Cited

U.S. PATENT DOCUMENTS

| | | | |
|---|---|---|---|
| 3,271,341 | A | 9/1966 | Garrison, Jr. |
| 4,380,618 | A | 4/1983 | Khan et al. |
| 7,666,929 | B2 * | 2/2010 | Teter et al. ..................... 523/310 |
| 7,705,074 | B2 * | 4/2010 | Brothers et al. ............... 524/131 |
| 7,999,049 | B2 * | 8/2011 | Coughlin et al. .............. 526/193 |
| 8,163,857 | B2 * | 4/2012 | Sato et al. ....................... 526/250 |
| 8,197,586 | B2 * | 6/2012 | Kaneumi et al. ........... 106/38.22 |
| 8,361,215 | B2 * | 1/2013 | Kaneumi et al. ........... 106/38.22 |
| 8,377,188 | B2 * | 2/2013 | Kaneumi et al. ........... 106/38.22 |
| 8,454,738 | B2 * | 6/2013 | Kaneumi et al. ........... 106/38.22 |
| 8,519,072 | B2 * | 8/2013 | Brothers et al. ............... 526/214 |
| 2006/0178472 | A1 * | 8/2006 | Johnson ........................ 524/805 |
| 2007/0270526 | A1 * | 11/2007 | Tazzia .......................... 523/414 |
| 2009/0036706 | A1 | 2/2009 | Murata et al. |
| 2009/0124754 | A1 * | 5/2009 | Coughlin et al. ............. 524/746 |
| 2010/0036053 | A1 * | 2/2010 | Aten et al. ..................... 524/805 |
| 2010/0273921 | A1 | 10/2010 | Hierse et al. |
| 2011/0315050 | A1 * | 12/2011 | Kaneumi et al. ........... 106/38.22 |
| 2012/0041201 | A1 * | 2/2012 | Kokin et al. .................. 544/332 |
| 2012/0077930 | A1 * | 3/2012 | Kaneumi et al. .............. 524/612 |
| 2012/0090504 | A1 * | 4/2012 | Kaneumi et al. ........... 106/38.22 |
| 2012/0108849 | A1 * | 5/2012 | Murata et al. ................... 568/14 |
| 2012/0174822 | A1 * | 7/2012 | Kaneumi et al. ........... 106/38.22 |
| 2012/0178075 | A1 * | 7/2012 | Kaneumi et al. .............. 435/1.1 |
| 2012/0180696 | A1 * | 7/2012 | Kaneumi et al. ........... 106/38.22 |
| 2012/0214148 | A1 * | 8/2012 | Kaneumi et al. .............. 435/1.1 |
| 2013/0079466 | A1 * | 3/2013 | Kaneumi et al. .............. 524/712 |
| 2013/0331516 | A1 * | 12/2013 | Brothers et al. .............. 524/805 |

FOREIGN PATENT DOCUMENTS

| | | |
|---|---|---|
| CN | 101400633 A | 4/2009 |
| JP | 58-180597 | 10/1983 |
| JP | 59-166596 | 9/1984 |
| JP | 60-190309 | 9/1985 |
| JP | 60-193615 | 10/1985 |
| JP | 01-285312 | 11/1989 |
| JP | 10-212261 | 8/1998 |
| JP | 2003-165802 | 6/2003 |
| JP | 2011-098250 | 5/2011 |
| WO | WO 2007/105633 A1 | 9/2007 |
| WO | WO 2008/050588 A1 | 5/2008 |
| WO | WO 2009/071214 A2 | 6/2009 |
| WO | WO 2009/093567 A1 | 7/2009 |

OTHER PUBLICATIONS

Bennett et al. Journal of Fluorine Chemistry 130 (2009) pp. 615-620.*
International Preliminary Report on Patentability and Written Opinion from corresponding PCT application No. PCT/JP2011/061031 dated Dec. 20, 2012 (7 pgs).
International Search Report based on PCT application No. PCT/JP2011/061031 dated Aug. 16, 2011 (4 pgs).

* cited by examiner

*Primary Examiner* — Michael Pepitone
*Assistant Examiner* — Michael A Salvitti
(74) *Attorney, Agent, or Firm* — Brinks Gilson & Lione

(57) ABSTRACT

Disclosed is a fluorine-containing polymer aqueous dispersion in which a fluorine-containing polymer is dispersed using, as an emulsifier, a polyfluoroalkylphosphonic acid salt represented by the general formula:

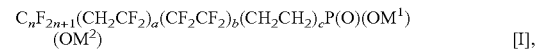

wherein $M^1$ is a hydrogen atom, an alkali metal, an ammonium base, or an organic amine base, $M^2$ is an alkali metal, an ammonium base, or an organic amine base, n is an integer of 1 to 6, a is an integer of 1 to 4, b is an integer of 1 to 3, and c is an integer of 1 to 3. This fluorine-containing polymer aqueous dispersion uses a polyfluoroalkylphosphonic acid salt with a low bioaccumulation potential as an emulsifier, and has excellent mechanical stability.

5 Claims, No Drawings

FLUORINE-CONTAINING POLYMER AQUEOUS DISPERSION

RELATED APPLICATION

This application is a 35 U.S.C. §371 national phase filing of International Patent Application No. PCT/JP2011/061031, filed May 13, 2011, through which and to which priority is claimed under 35 U.S.C. §119 to Japanese Patent Application No. 2010-118951, filed May 25, 2010.

TECHNICAL FIELD

The present invention relates to a fluorine-containing polymer aqueous dispersion. More particularly, the present invention relates to a fluorine-containing polymer aqueous dispersion using an emulsifier with a low bioaccumulation potential and having excellent mechanical stability.

BACKGROUND ART

Perfluoroalkyl group-containing carboxylic acids (salts) are widely used in the emulsion polymerization of fluorine-containing monomers as fluoro-based surfactants that act as emulsifiers. In particular, perfluorooctanoic acid $C_7F_{15}COOH$ or a salt thereof (hereinafter abbreviated as [PFOA]) is known as a surfactant having excellent monomer-emulsifying properties and latex stability.

However, perfluorinated chemical substances are difficult to degrade in the natural environment. Further, it has recently been revealed that $C_8$ perfluorinated compounds, typified by PFOA, are extremely remaining in the human body. In addition, due to the high affinity of PFOA to polymers, after agglutination of polymer latex obtained by emulsion polymerization, a large amount of PFOA adheres or remains in the fluorine-containing polymer. There is a strong demand for reducing the amount of adhering or remaining PFOA.

As a means for imparting environmental degradability to fluorine-containing emulsifiers, it is possible to provide a hydrogenated portion in the perfluorinated hydrophobic group of the surfactant compound. Moreover, as a means for lowering the environmental remaining of decomposition products, it is considered desirable that the hydrophobic group has a perfluorinated continuous carbon chain with less than 8 carbon atoms (e.g., $C_nF_{2n+1}C_pH_{2p}C_qF_{2q}-$ (m, q: 1 to 7; p: 1 or more)).

Patent Document 1 describes the use, as a dispersing agent, of a mixture of a compound represented by the general formula:

$F(CF_2CF_2)_nCH_2CH_2SO_3M$ (M: monovalent cation)

wherein n is a cardinal number of 2 to 8 and the average value of n is 2 to 6, and a compound of the above formula wherein n is a cardinal number of 2 to 6. However, when this perfluoroalkyl ethanesulfonic acid (salt) is used as a fluorine-containing surfactant, chain transfer occurs during the polymerization reaction. Consequently, the resulting polymer inevitably has a lower molecular weight.

As a hydrogen-containing, fluoro-based surfactant that is less likely to undergo chain transfer during the polymerization reaction, Patent Document 2 proposes the use of a compound represented by the general formula:

$Rf(CH_2)_mR'fCOOM$

Rf: $C_3$-$C_8$ perfluoroalkyl group or perfluoroalkoxyl group
R'f: $C_1$-$C_4$ perfluoroalkylene group
M: $NH_4$, Li, Na, K, or H
m: 1 to 3.

However, when used as an emulsifier for the emulsion polymerization of fluorine-based monomers, this compound is inferior to PFOA in terms of monomer-emulsifying properties and latex stability. Further, in homopolymerization or copolymerization of vinylidene fluoride, the low micelle solubility of the vinylidene fluoride as a monomer significantly lowers the polymerization rate. In addition, the obtained polymer latex has poor stability, and precipitates may be produced during the polymerization reaction.

Moreover, the hydrogen-containing, fluoro-based surfactant $Rf(CH_2)_mRf'COOM$ described in Patent Document 2 is obtained by alkali hydrolysis of the corresponding carboxylic ester to form a free carboxylic acid, followed by reaction with a base to form a carboxylic acid salt. Since the alkali hydrolysis of the carboxylic ester is carried out in the presence of excess amount of alkali, a side reaction occurs to produce about several percent of product in which the $—CH_2CF_2—$ group in the molecule is converted to a $—CH=CF—$ group by an HF-elimination reaction.

Furthermore, there have been attempts to use fluorine-containing polyether carboxylic acids (salts) as emulsifiers (see Patent Document 3); however, many of this type of compounds have low solubility in aqueous media and are extremely difficult to handle. Further, washing after coagulation is not easy. Among polyether-based carboxylic acid (salt) emulsifiers, this tendency is particularly remarkable in those having side chains or a long chain.

It is also described that polyether carboxylic acids (salts) are easy to bubble, the latex obtained by polymerization is not easy to handle, and the amount of aggregate in the latex is greater than that of PFOA (see Patent Document 3).

In addition, polyfluoroalkylphosphonic acid esters are widely used as starting materials for the synthesis of mold-releasing agents. Compounds having a $C_8$-$C_{12}$ perfluoroalkyl group are most likely to develop mold release performance when used as mold-releasing agents. In particular, perfluorooctyl group-containing compounds of the formula:

$CF_3(CF_2)_7CH_2CH_2P(O)(OC_2H_5)_2$ are preferably used for this kind of application (see Patent Documents 4 to 7).

As described above, it is reported that compounds having a $C_8$-$C_{12}$ perfluoroalkyl group are biologically degraded in the environment and converted to compounds having relatively high bioaccumulation and environmental concentration, causing concerns for exposure during treatment processes, and for release or diffusion from waste, treated substrates, etc., into the environment. Moreover, compounds having a perfluoroalkyl group containing 14 or more carbon atoms are very difficult to handle because of their physical and chemical properties. Hence, such compounds are rarely used in practice.

Furthermore, as for telomer compounds having a perfluoroalkyl group containing 8 or more carbon atoms, generation and mixing of perfluorooctanoic acids with a high bioaccumulation potential is unavoidable during the production of these compounds. For these reasons, companies that produce such telomer compounds have retreated from the production of the compounds or promoted the use of alternative compounds having a perfluoroalkyl group containing 6 or less carbon atoms.

However, compounds having a perfluoroalkyl group containing 6 or less carbon atoms cause a significant decrease in orientation on the surface of a treated substrate, and the melting point, glass transition point (Tg), etc., of the compounds are markedly lower than those of $C_8$ compounds. Accordingly, the compounds are highly influenced by their environmental conditions, such as temperature, humidity, stress, and contact with organic solvents. Consequently, the desired performance cannot be sufficiently achieved, and durability and other properties are affected.

Fluorine-containing polymer resins, which are fluorine-containing polymers, are widely used for coating materials because of their excellent antifouling properties and weather resistance. Further, fluorine-containing polymer elastomers have excellent heat resistance, oil resistance, chemical resistance, etc. Vulcanization molded products thereof are widely used as various sealing materials, such as oil seal, O rings, packing, and gaskets.

Aqueous dispersions of fluorine-containing polymers used for this type of application are subjected to mechanical processes (e.g., filtration through a metal sieve) when used; therefore, they are required to have sufficient stability therefor.

PRIOR ART DOCUMENT

Patent Document

Patent Document 1: U.S. Pat. No. 4,380,618
Patent Document 2: JP-A-10-212261
Patent Document 3: U.S. Pat. No. 3,271,341
Patent Document 4: JP-B-2-45572
Patent Document 5: JP-B-3-78244
Patent Document 6: JP-B-4-4923
Patent Document 7: JP-B-4-11366
Patent Document 8: WO 2007/105633 A1
Patent Document 9: WO 2009/093567 A1
Patent Document 10: WO 2008/050588 A1

OUTLINE OF THE INVENTION

Problem to be Solved by the Invention

An object of the present invention is to provide a fluorine-containing polymer aqueous dispersion using an emulsifier with a low bioaccumulation potential and having excellent mechanical stability.

Means for Solving the Problem

The above object of the present invention can be achieved by a fluorine-containing polymer aqueous dispersion in which a fluorine-containing polymer is dispersed using, as an emulsifier, a polyfluoroalkylphosphonic acid salt represented by the general formula:

$$C_nF_{2n+1}(CH_2CF_2)_a(CF_2CF_2)_b(CH_2CH_2)_cP(O)(OM^1)(OM^2) \quad [I]$$

wherein $M^1$ is a hydrogen atom, an alkali metal, an ammonium base, or an organic amine base, $M^2$ is an alkali metal, an ammonium base, or an organic amine base, n is an integer of 1 to 6, a is an integer of 1 to 4, b is an integer of 1 to 3, and c is an integer of 1 to 3.

The fluorine-containing polymer aqueous dispersion is preferably obtained by emulsion polymerization of a fluorine-containing monomer in the presence of an aqueous solution of the polyfluoroalkylphosphonic acid salt emulsifier represented by the general formula [I].

Effect of the Invention

The polyfluoroalkylphosphonic acid salt emulsifier, particularly ammonium salt emulsifier, according to the present invention is a compound having a perfluoroalkyl group containing 6 or less carbon atoms, which is said to have a low bioaccumulation potential, and also having emulsification performance equivalent to the excellent emulsification performance of pentadecafluorooctanoic acid ammonium. A fluorine-containing polymer aqueous dispersion produced by using an aqueous solution of this emulsifier can form a stable emulsion. The emulsification stability of the emulsion is maintained at an excellent level even after being left for one month at room temperature or 40° C.

In addition, the fluorine-containing polymer aqueous dispersion has excellent mechanical stability. For example, when the fluorine-containing polymer aqueous dispersion is passed through a metal sieve 10 times, there is almost no change in the diameter of the dispersed particles.

EMBODIMENTS FOR CARRYING OUT THE INVENTION

The polyfluoroalkylphosphonic acid used as an emulsifier after forming a salt is represented by the general formula:

$$C_nF_{2n+1}(CH_2CF_2)_a(CF_2CF_2)_b(CH_2CH_2)_cP(O)(OH)_2 \quad [II]$$

wherein n is an integer of 1 to 6, a is an integer of 1 to 4, b is an integer of 1 to 3, and c is an integer of 1 to 3. This compound is produced by the hydrolysis reaction of a polyfluoroalkylphosphonic acid diester represented by the general formula:

$$C_nF_{2n+1}(CH_2CF_2)_a(CF_2CF_2)_b(CH_2CH_2)_cP(O)(OR)_2 \quad [III]$$

wherein R is an alkyl group having 1 to 4 carbon atoms.

The polyfluoroalkylphosphonic acid diester [III], which is used as a starting material for this reaction, is obtained by the reaction of a polyfluoroalkyl iodide of the general formula:

$$C_nF_{2n+1}(CH_2CF_2)_a(CF_2CF_2)_b(CH_2CH_2)_cI \quad [IV]$$

with trialkyl phosphite $P(OR)_3$. The polyfluoroalkyl iodide [IV] is a known compound and is disclosed in Patent Documents 8 and 9.

The polyfluoroalkyl iodide [IV] can be reacted with trialkyl phosphite $P(OR)_3$ having an alkyl group containing 1 to 4 carbon atoms, such as trimethyl phosphite, triethyl phosphite, tripropyl phosphite, or tributyl phosphite, to perform an RI-elimination reaction. Thus, the polyfluoroalkylphosphonic acid diester [III], which is used as a starting material, is obtained. When the ethylene addition reaction is not carried out adjacent to the terminal group I of the polyfluoroalkyl iodide [IV], the RI-elimination reaction with trialkyl phosphite does not proceed.

The hydrolysis reaction of the polyfluoroalkylphosphonic acid diester [III] can be readily carried out by stirring at about 90 to 100° C. in the presence of an acid catalyst, such as inorganic acid typified by concentrated hydrochloric acid. The resulting reaction mixture is filtered under reduced pressure, followed by water washing/filtration, acetone washing/filtration, and other methods, thereby obtaining the target polyfluoroalkylphosphonic acid [II] with a good yield of 90% or more.

The polyfluoroalkylphosphonic acid salt represented by the general formula:

$$C_nF_{2n+1}(CH_2CF_2)_a(CF_2CF_2)_b(CH_2CH_2)_cP(O)(OM^1)(OM^2) \quad [I]$$

used as an emulsifier is obtained by reacting the polyfluoroalkylphosphonic acid represented by the general formula:

$$C_nF_{2n+1}(CH_2CF_2)_a(CF_2CF_2)_b(CH_2CH_2)_cP(O)(OH)_2 \quad [II]$$

with an alkali metal hydroxide aqueous solution, aqueous ammonia solution, or organic amine.

As the alkali metal hydroxide, for example, sodium hydroxide, potassium hydroxide, or the like is preferably used. As the organic amine, for example, monoethylamine, monoisopropylamine, diethylamine, diisopropanolamine, dicyclohexylamine, triethylamine, monoethanolamine, diethanolamine, triethanolamine, tris(2-hydroxyethyl)amine, pyridine, morpholine, or a derivative thereof is preferably used. The alkali metal hydroxide, ammonia, or organic amine forms mono-salts when used in an amount equimolar to the polyfluoroalkylphosphonic acid, and forms di-salts when used in an amount of two times the mole of the polyfluoroalkylphosphonic acid. Generally, the alkali metal hydroxide, ammonia, or organic amine is used in an amount not less than the theoretically required number of moles. When the alkali metal hydroxide, ammonia, or organic amine is used in an amount equimolar or more and less than two times the mole of the polyfluoroalkylphosphonic acid, a mixture of mono-salts and di-salts is formed.

The polyfluoroalkylphosphonic acid salt is used as an aqueous solution in which the salt is dissolved in an aqueous medium (water or a water-soluble organic solvent aqueous solution), or as an organic solvent solution in which the salt is dissolved in an organic solvent. Examples of the organic solvent include alcohols, such as methanol, ethanol, and isopropanol; ketones, such as acetone, methyl ethyl ketone, and methyl isobutyl ketone; and aprotic polar solvents, such as acetonitrile, dimethylformamide, diethylformamide, dimethylacetamide, and N-methyl-2-pyrrolidone.

As for the emulsification ability of the polyfluoroalkylphosphonic acid salt, in the case of, for example, a 2-(perfluorohexyl)ethyl phosphonic acid ammonium aqueous solution, the critical micelle concentration [CMC] of the solution appears at an emulsifier concentration of about 0.8 wt. %, and the solution has constant low surface tension at an emulsifier concentration of about 1.0 wt. % or more.

The fluorine-containing polymer aqueous dispersion of the present invention is preferably obtained by emulsion polymerization of a fluorine-containing monomer in the presence of an aqueous solution of the polyfluoroalkylphosphonic acid salt emulsifier (fluorinated emulsifier) represented by the general formula [I].

The amount of fluorinated emulsifier used can be changed depending on the solid matters content, average particle diameter, and other properties of the obtained aqueous dispersion. Generally, the amount of fluorinated emulsifier is about 0.001 to 5 wt. %, preferably about 0.005 to 2 wt. %, and particularly preferably about 0.005 to 1 wt. %, based on the weight of the aqueous medium used in the polymerization reaction. The emulsion polymerization reaction is initiated in the presence of such a fluorine-based emulsifier, and the fluorine-based emulsifier can be further added during the polymerization reaction. In addition to the fluorine-based emulsifier, at least one of other fluorine-based emulsifiers and non-fluorine-based emulsifiers can be used in combination.

The emulsion polymerization reaction of a fluorine-containing monomer using this emulsifier is carried out in the same manner as in the case of using a conventional PFOA emulsifier, which is a perfluorooctanoic acid (salt). The emulsion polymerization reaction is performed in the presence of an inorganic peroxide, azo compound, organic peroxide, or the like, preferably using, as a catalyst, a water-soluble inorganic peroxide (e.g., ammonium persulfate, sodium persulfate, or potassium persulfate) or a redox system of such a water-soluble inorganic peroxide with a reducing agent, such as a bisulfite (e.g., sodium bisulfite or sodium metabisulfite), thiosulfate, hydrazine, or azodicarboxylate. In this case, in order to adjust the pH of the polymerization system, an electrolyte substance having a buffer capacity, such as a phosphate (e.g., $Na_2HPO_4$, $NaH_2PO_4$, or $KH_2PO_4$) or borate ($Na_2B_2O_7$); NaOH; or the like can be added. The emulsion polymerization reaction is performed using a polymerization initiator in an amount of about 0.01 to 1 wt. %, preferably about 0.05 to 0.5 wt. %, more preferably about 0.05 to 0.3 wt. %, based on the fluorine-containing polymer to be produced, at about 0 to 100° C., preferably about 5 to 80° C., for about 1 to 48 hours under pressurized conditions of about 0.1 to 10 MPa, preferably about 0.2 to 5 MPa. The polymerization initiator may be added again during the polymerization reaction, if necessary.

As the fluorine-containing monomer to be subjected to emulsion polymerization, at least one monomer, generally two or three monomers, of vinylidene fluoride [VdF], vinyl fluoride [VF], hexafluoropropylene [HFP], tetrafluoroethylene [TFE], pentafluoropropylene [PFP], monochlorotrifluoroethylene [CTFE], perfluoro(alkyl vinyl ether) [FAVE] having a $C_1$-$C_3$ alkyl group, perfluoro(alkoxyalkyl vinyl ether) [FOAVE], etc., is(are) copolymerized. When only one monomer is used, the monomer may be homopolymerized or copolymerized with α-olefin, such as ethylene and propylene. The copolymerization reaction is preferably performed as an addition in batch process in terms of the compositional homogeneity of the resulting fluorine-containing polymer, particularly fluorine-containing copolymer elastomer.

Examples of polymers of fluorine-containing monomers are shown below. They can form resinous or elastomeric fluorine-containing polymers depending of their copolymerization compositions.

VdF homopolymer
    TFE homopolymer
    VdF-TFE copolymer
    VdF-HFP copolymer
    VdF-TFE-FMVE terpolymer
    VdF-TFE-HFP terpolymer
    VdF-TFE-CTFE terpolymer
    VdF-CTFE copolymer
    VdF-TFE-P terpolymer
    TFE-P copolymer
    TFE-E copolymer
    TFE-CTFE copolymer
    TFE-HFP copolymer
    TFE-FMVE copolymer
    TFE-FPVE copolymer
    TFE-FMVE-FPVE terpolymer
    TFE-FEVE-FPVE terpolymer
    VdF-TFE-FMVE terpolymer Preferably, the VdF-HFP copolymer, VdF-TFE-FMVE terpolymer, VdF-TFE-HFP terpolymer, or TFE-FMVE copolymer is used.

Notes:
      E: ethylene
      P: propylene
      FMVE: perfluoro(methyl vinyl ether)
      FEVE: perfluoro(ethyl vinyl ether)
      FPVE: perfluoro(propyl vinyl ether)

In the copolymerization reaction, esters, such as ethyl malonate and ethyl acetate; ethers, such as dimethyl ether and methyl tert-butyl ether; alcohols, such as methanol, ethanol, and isopropanol; ketones, such as acetone, methyl ethyl ketone, and methyl isobutyl ketone; $C_1$-$C_5$ alkanes; halogenated hydrocarbons, such as chloroform, carbon tetrachloride, and dichloroethane; and other various compounds can be used as chain transfer agents. Further, iodine-containing perfluoro compounds, such as $ICF_2CF_2I$ and $ICF_2CF_2CF_2CF_2I$, and iodine- and bromine-containing perfluoro compounds, such as ICF$_2$CF$_2$Br and ICF$_2$CF$_2$CF$_2$CF$_2$Br, can also be used as chain transfer agents. These compounds can serve to form crosslinking sites in peroxide crosslinking.

Usable examples of the bromine- or iodine-containing monomer compound used to form crosslinking sites include vinyl bromide, vinyl iodide, 1-bromo-2,2-difluoroethylene, 1-iodo-2,2-difluoroethylene, 1-iodo-1,2,2-trifluoroethylene, perfluoroallyl bromide, perfluoroallyl iodide, 4-bromo-1,1,2-trifluorobutene, 4-iodo-1,1,2-trifluorobutene, 4-bromo-3,3,4,4-tetrafluorobutene, bromotrifluoroethylene, iodotrifluoroethylene, and other brominated or iodinated vinyl compounds or brominated or iodinated olefins. The brominated or iodinated vinyl compound or olefin compound may be a compound represented by the general formula:

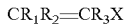
$CR_1R_2=CR_3X$ or

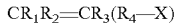
$CR_1R_2=CR_3(R_4-X)$ $R^1$, $R^2$, and $R^3$: same or different groups selected from H, F, Cl, $C_1$-$C_{10}$ alkyl group, and fluoroalkyl group; these groups may contain an ether bond $R^4$: $C_1$-$C_{10}$ alkyl group or fluoroalkyl group; these groups may contain an ether bond X: Br or I.

Preferably, a bromine group-containing vinyl ether represented by the following general formula is used.

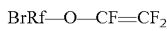
$BrRf-O-CF=CF_2$

BrRf: bromine group-containing perfluoroalkyl group
Usable examples of such bromine group-containing perfluorovinyl ethers include $CF_2BrCF_2OCF=CF_2$, $CF_2Br(CF_2)_2OCF=CF_2$, $CF_2Br(CF_2)_3OCF=CF_2$, $CF_3CFBr(CF_2)_2OCF=CF_2$, $CF_2Br(CF_2)_4OCF=CF_2$, and the like.

Other than these, for example, a bromine group-containing vinyl ether represented by the general formula: $ROCF=CFBr$ or $ROCBr=CF_2$ (R: lower alkyl group or fluoroalkyl group) can also be used.

Moreover, as the iodine-containing monomer compound, an iodine group-containing perfluorovinyl ether represented by the general formula:

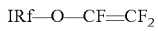
$IRf-O-CF=CF_2$

IRf: iodine group-containing perfluoroalkyl group
is used. Preferably, perfluoro(2-iodoethyl vinyl ether) is used.

These bromine- or iodine-containing monomer compounds are used singly or in combination of two or more, depending on crosslinking conditions, their reactivity, and other conditions, in an amount of about 0.001 to 5 mol %, preferably about 0.01 to 1 mol %, based on the total amount of the fluorine-containing monomers. When the proportion of the monomer compounds is lower than this range, the compression set characteristics of the resulting vulcanizate are impaired; whereas when the proportion is greater than this range, the elongation of the vulcanizate decreases.

Furthermore, as the iodine- and bromine-containing compound, a compound represented by the general formula: $RBr_nI_m$ (R: $C_1$-$C_{10}$ fluorohydrocarbon group, chlorofluorohydrocarbon group, chlorohydrocarbon group, or hydrocarbon group; n, m: 1 or 2) is used. Specific examples thereof are described, for example, in Patent Document 10.

The coagulation of the obtained fluorine-containing polymer latex is preferably performed by salting-out. For example, a calcium chloride aqueous solution with a concentration of about 0.1 to 5 wt. %, preferably about 0.3 to 3 wt. %, is used. The coagulated fluorine-containing polymer is subjected to processes of filtration, water washing, and drying.

The molecular weight of these fluorine-containing polymers is as follows: The weight average molecular weight (Mw) of the fluorine-containing resin is about 10,000 to 1,000,000, preferably 50,000 to 800,000. As for the fluorine-containing elastomer, in terms of the processability, mechanical properties, and other properties of the composition, the solution viscosity η sp/c (1 wt./vol. % methyl ethyl ketone solution, 35° C.), which is an indicator of the molecular weight, is about 0.3 to 1.5 dl/g, preferably about 0.4 to 1.3 dl/g.

The vulcanization of the fluorine-containing elastomer is performed using an organic peroxide when the fluorine-containing elastomer has a bromine group or an iodine group, or by polyol vulcanization, etc., in other cases.

Examples of the organic peroxide used in the peroxide vulcanization method include 2,5-dimethyl-2,5-bis(tert-butylperoxy)hexane, 2,5-dimethyl-2,5-bis(tert-butylperoxy)hexyne-3, benzoyl peroxide, bis(2,4-dichlorobenzoyl)peroxide, dicumyl peroxide, di-tert-butyl peroxide, tert-butyl cumyl peroxide, tert-butylperoxy benzene, 1,1-bis(tert-butylperoxy)-3,5,5-trimethylcyclohexane, 2,5-dimethylhexane-2,5-dihydroxyperoxide, α,α'-bis(tert-butylperoxy)-p-diisopropylbenzene, 2,5-dimethyl-2,5-di(benzoylperoxy)hexane, tert-butylperoxyisopropyl carbonate, and the like.

In the peroxide vulcanization method using such an organic peroxide, a polyfunctional unsaturated compound is generally used in combination as a co-crosslinking agent. Examples thereof include tri(meth)allyl isocyanurate, tri(meth)allyl cyanurate, triallyl trimellitate, N,N'-m-phenylenebismaleimide, diallyl phthalate, tris(diallylamine)-s-triazine, triallyl phosphite, 1,2-polybutadiene, ethylene glycol diacrylate, diethylene glycol diacrylate, and the like.

The amount of each of the above components added to the peroxide vulcanization system is generally as follows: Based on 100 parts by weight of fluorine-containing elastomer, the amount of organic peroxide is about 0.1 to 10 parts by weight, preferably about 0.5 to 5 parts by weight; and the amount of co-crosslinking agent is about 0.1 to 10 parts by weight, preferably about 0.5 to 5 parts by weight.

In the case of polyol vulcanization, 2,2-bis(4-hydroxyphenyl)propane [bisphenol A], 2,2-bis(4-hydroxyphenyl)perfluoropropane [bisphenol AF], hydroquinone, catechol, resorcin, 4,4'-dihydroxydiphenyl, 4-4'-dihydroxydiphenylmethane, 4,4'-dihydroxydiphenylsulfone, 2,2-bis(4-hydroxyphenyl)butane, and like polyhydroxy aromatic compounds, or alkali metal salts or alkaline earth metal salts thereof can be used as polyol crosslinking agents. Such a polyol crosslinking agent is used in an amount of about 0.5 to 10 parts by weight, preferably about 1 to 5 parts by weight, based on 100 parts by weight of fluorine-containing elastomer.

Moreover, as a vulcanization accelerator for polyol crosslinking reaction, a quaternary onium salt, such as a quaternary ammonium salt or a quaternary phosphonium salt, is used in an amount of about 0.1 to 30 parts by weight, preferably about 0.2 to 20 parts by weight, based on 100 parts by weight of fluorine-containing elastomer.

In addition, as a polyol crosslinking agent or a quaternary phosphonium salt, or both, a compound obtained by reacting a bisphenol compound with a quaternary phosphonium halide in a molar amount of 2, that is, a bisphenol compound having quaternary phosphonium salt groups in both ends, can be used singly or in combination with other vulcanizing agents.

The above vulcanization system components can directly be mixed and kneaded with the fluorine-containing elastomer, or can be used as a masterbatch dispersion with the fluorine-containing elastomer diluted with carbon black, silica, clay, talc, diatomaceous earth, barium sulfate, or the like. In addition to the aforementioned components, the composition can suitably contain well-known fillers or reinforcing agents (e.g. carbon black, silica, graphite, clay, talc, diatomaceous earth, barium sulfate, titanium oxide, and wollastonite), plasticizers, lubricants, processing aids, pigments, etc.

Vulcanization is carried out by mixing the above components using a generally used mixing method, such as roll mixing, kneader mixing, Banbury mixing, or solution mixing, followed by heating. Vulcanization is generally carried out by primary vulcanization performed at about 100 to 250° C. for about 1 to 120 minutes and secondary vulcanization performed at about 150 to 300° C. for about 0 to 30 hours. Vulcanization can also be carried out by injection molding.

EXAMPLES

The following describes the present invention with reference to Examples.

Reference Example 1

(1) In a 1-L four-necked flask equipped with a thermometer and a receiver for removing low-boiling substances, 500 g (0.78 mol) of a compound of the formula:

$$CF_3(CF_2)_3(CH_2CF_2)(CF_2CF_2)_2(CH_2CH_2)I \ (99 \ GC \ \%)$$

and 181 g (1.56 mol) of triethyl phosphite $P(OC_2H_5)_3$ were charged, and the mixture was stirred at 155° C. At this time, to remove the by-product, i.e., ethyl iodide, from the reaction system, nitrogen gas was bubbled into the reaction solution using a small tube. A slight amount of reaction solution was taken and subjected to gas chromatographic analysis to confirm the remaining amount of triethyl phosphite. Thereafter, triethyl phosphite was further added in four batches in an amount of 91 g (0.78 mol) per batch, and the mixture was stirred for 18 hours in total.

After the reaction was completed, the reaction mixture was subjected to simple distillation under reduced pressure at an internal pressure of 0.2 kPa, an internal temperature of 160 to 170° C., and an overhead temperature of 150 to 155° C. The distillate fraction was washed with water, thereby obtaining 412 g (yield: 78%) of a purified reaction product (96 GC %).

The results of $^1$H-NMR and $^{19}$F-NMR confirmed that the resulting purified reaction product was a compound represented by the following formula:

$$CF_3(CF_2)_3(CH_2CF_2)(CF_2CF_2)_2(CH_2CH_2)P(O)(OCH_2CH_3)_2.$$

(2) In a 1-L four-necked flask equipped with a thermometer and a condenser, 300 g (0.44 mol) of the obtained polyfluoroalkylphosphonic acid diester of the formula:

$$CF_3(CF_2)_3(CH_2CF_2)(CF_2CF_2)_2(CH_2CH_2)P(O)(OCH_2CH_3)_2 \ (96 \ GC \ \%)$$

and 300 g of about 35% concentrated hydrochloric acid were charged, and the mixture was stirred at 100° C. for 12 hours. After cooling, filtration under reduced pressure was performed to thereby collect 276 g of solid matters. The solid matters were washed with water and filtrated again, further followed by acetone washing and filtration, thereby obtaining 242 g (0.41 mol; yield: 92%) of the target product.

The results of $^1$H-NMR and $^{19}$F-NMR confirmed that the resulting product was the target compound (polyfluoroalkylphosphonic acid) represented by the following formula:

$$CF_3(CF_2)_3(CH_2CF_2)(CF_2CF_2)_2(CH_2CH_2)P(O)(OH)_2 \quad [IIa]$$

Reference Example 2

(1) In a 1-L four-necked flask equipped with a thermometer and a receiver for removing low-boiling substances, 500 g (0.92 mol) of a compound of the formula:

$$CF_3(CF_2)_3(CH_2CF_2)(CF_2CF_2)(CH_2CH_2)I \ (99 \ GC \ \%)$$

and 213 g (1.84 mol) of triethyl phosphite $P(OC_2H_5)_3$ were charged, and the mixture was stirred at 155° C. At this time, to remove the by-product, i.e., ethyl iodide, from the reaction system, nitrogen gas was bubbled into the reaction solution using a small tube. A slight amount of reaction solution was taken and subjected to gas chromatographic analysis to confirm the remaining amount of triethyl phosphite. Thereafter, triethyl phosphite was further added in four batches in an amount of 107 g (0.92 mol) per batch, and the mixture was stirred for 18 hours in total.

After the reaction was completed, the reaction mixture was subjected to simple distillation under reduced pressure at an internal pressure of 0.2 kPa, an internal temperature of 145 to 155° C., and an overhead temperature of 138 to 142° C. The distillate fraction was washed with water, thereby obtaining 407 g (yield: 79%) of a purified reaction product (98 GC %).

The results of $^1$H-NMR and $^{19}$F-NMR confirmed that the resulting purified reaction product was a compound represented by the following formula:

$$CF_3(CF_2)_3(CH_2CF_2)(CF_2CF_2)(CH_2CH_2)P(O)(OCH_2CH_3)_2.$$

(2) In a 1-L four-necked flask equipped with a thermometer and a condenser, 300 g (0.53 mol) of the obtained polyfluoroalkylphosphonic acid diester of the formula:

$$CF_3(CF_2)_3(CH_2CF_2)(CF_2CF_2)(CH_2CH_2)P(O)(OCH_2CH_3)_2 \ (96 \ GC \ \%)$$

and 300 g of about 35% concentrated hydrochloric acid were charged, and the mixture was stirred at 100° C. for 12 hours. After cooling, filtration under reduced pressure was performed to thereby collect 287 g of solid matters. The solid matters were washed with water and filtrated again, further followed by acetone washing and filtration, thereby obtaining 240 g (0.49 mol; yield: 93%) of the target product.

The results of $^1$H-NMR and $^{19}$F-NMR confirmed that the resulting product was the target compound (polyfluoroalkylphosphonic acid) represented by the following formula:

$$CF_3(CF_2)_3(CH_2CF_2)(CF_2CF_2)(CH_2CH_2)P(O)(OH)_2 \quad [IIb]$$

Reference Example 3

(1) In a 1-L four-necked flask equipped with a thermometer and a receiver for removing low-boiling substances, 500 g (0.76 mol) of a compound of the formula:

$$CF_3(CF_2)(CH_2CF_2)(CF_2CF_2)_3(CH_2CH_2)I \ (97 \ GC \ \%)$$

and 176 g (1.52 mol) of triethyl phosphite $P(OC_2H_5)_3$ were charged, and the mixture was stirred at 155° C. At this time, to remove the by-product, i.e., ethyl iodide, from the reaction system, nitrogen gas was bubbled into the reaction solution using a small tube. A slight amount of reaction solution was taken and subjected to gas chromatographic analysis to confirm the remaining amount of triethyl phosphite. Thereafter, triethyl phosphite was further added in four batches in an amount of 88 g (0.76 mol) per batch, and the mixture was stirred for 18 hours in total.

After the reaction was completed, the reaction mixture was subjected to simple distillation under reduced pressure at an internal pressure of 0.2 kPa, an internal temperature of 160 to 170° C., and an overhead temperature of 150 to 155° C. The distillate fraction was washed with water, thereby obtaining 395 g (yield: 77%) of a purified reaction product (96 GC %).

The results of $^1$H-NMR and $^{19}$F-NMR confirmed that the resulting purified reaction product was a compound represented by the following formula:

$$CF_3(CF_2)(CH_2CF_2)(CF_2CF_2)_3(CH_2CH_2)P(O)(OCH_2CH_3)_2.$$

(2) In a 1-L four-necked flask equipped with a thermometer and a condenser, 300 g (0.44 mol) of the obtained polyfluoroalkylphosphonic acid diester of the formula:

$$CF_3(CF_2)(CH_2CF_2)(CF_2CF_2)_3(CH_2CH_2)P(O)(OCH_2CH_3)_2 \text{ (96 GC %)}$$

and 300 g of about 35% concentrated hydrochloric acid were charged, and the mixture was stirred at 100° C. for 12 hours. After cooling, filtration under reduced pressure was performed to thereby collect 276 g of solid matters. The solid matters were washed with water and filtrated again, further followed by acetone washing and filtration, thereby obtaining 237 g (0.40 mol; yield: 90%) of the target product.

The results of $^1$H-NMR and $^{19}$F-NMR confirmed that the resulting product was the target compound (polyfluoroalkylphosphonic acid) represented by the following formula:

$$CF_3(CF_2)(CH_2CF_2)(CF_2CF_2)_3(CH_2CH_2)P(O)(OH)_2 \quad [IIc]$$

Reference Example 4

(1) In a 1-L four-necked flask equipped with a thermometer and a receiver for removing low-boiling substances, 500 g (0.90 mol) of a compound of the formula:

$$CF_3(CF_2)(CH_2CF_2)(CF_2CF_2)_2(CH_2CH_2)I \text{ (97 GC %)}$$

and 208 g (1.80 mol) of triethyl phosphite P(OC$_2$H$_5$)$_3$ were charged, and the mixture was stirred at 155° C. At this time, to remove the by-product, i.e., ethyl iodide, from the reaction system, nitrogen gas was bubbled into the reaction solution using a small tube. A slight amount of reaction solution was taken and subjected to gas chromatographic analysis to confirm the remaining amount of triethyl phosphite. Thereafter, triethyl phosphite was further added in four batches in an amount of 104 g (0.90 mol) per batch, and the mixture was stirred for 18 hours in total.

After the reaction was completed, the reaction mixture was subjected to simple distillation under reduced pressure at an internal pressure of 0.2 kPa, an internal temperature of 145 to 155° C., and an overhead temperature of 138 to 141° C. The distillate fraction was washed with water, thereby obtaining 397 g (yield: 78%) of a purified reaction product (97 GC %).

The results of $^1$H-NMR and $^{19}$F-NMR confirmed that the resulting purified reaction product was a compound represented by the following formula:

$$CF_3(CF_2)(CH_2CF_2)(CF_2CF_2)_2(CH_2CH_2)P(O)(OCH_2CH_3)_2.$$

(2) In a 1-L four-necked flask equipped with a thermometer and a condenser, 300 g (0.52 mol) of the obtained polyfluoroalkylphosphonic acid diester of the formula:

$$CF_3(CF_2)(CH_2CF_2)(CF_2CF_2)_2(CH_2CH_2)P(O)(OCH_2CH_3)_2 \text{ (95 GC %)}$$

and 300 g of about 35% concentrated hydrochloric acid were charged, and the mixture was stirred at 100° C. for 12 hours. After cooling, filtration under reduced pressure was performed to thereby collect 271 g of solid matters. The solid matters were washed with water and filtrated again, further followed by acetone washing and filtration, thereby obtaining 235 g (0.48 mol; yield: 92%) of the target product.

The results of $^1$H-NMR and $^{19}$F-NMR confirmed that the resulting product was the target compound (polyfluoroalkylphosphonic acid) represented by the following formula:

$$CF_3(CF_2)(CH_2CF_2)(CF_2CF_2)_2(CH_2CH_2)P(O)(OH)_2 \quad [IId]$$

Reference Example 5

(1) In a 1-L four-necked flask equipped with a thermometer and a receiver for removing low-boiling substances, 500 g (0.88 mol) of a compound of the formula:

$$CF_3(CF_2)(CH_2CF_2)(CF_2CF_2)_2(CH_2CH_2)_2I \text{ (97 GC %)}$$

and 204 g (1.76 mol) of triethyl phosphite P(OC$_2$H$_5$)$_3$ were charged, and the mixture was stirred at 155° C. At this time, to remove the by-product, i.e., ethyl iodide, from the reaction system, nitrogen gas was bubbled into the reaction solution using a small tube. A slight amount of reaction solution was taken and subjected to gas chromatographic analysis to confirm the remaining amount of triethyl phosphite. Thereafter, triethyl phosphite was further added in four batches in an amount of 104 g (0.90 mol) per batch, and the mixture was stirred for 18 hours in total.

After the reaction was completed, the reaction mixture was subjected to simple distillation under reduced pressure at an internal pressure of 0.2 kPa, an internal temperature of 145 to 155° C., and an overhead temperature of 140 to 142° C. The distillate fraction was washed with water, thereby obtaining 410 g (yield: 79%) of a purified reaction product (97 GC %).

The results of $^1$H-NMR and $^{19}$F-NMR confirmed that the resulting purified reaction product was a compound represented by the following formula:

$$CF_3(CF_2)(CH_2CF_2)(CF_2CF_2)_2(CH_2CH_2)_2P(O)(OCH_2CH_3)_2.$$

(2) In a 1-L four-necked flask equipped with a thermometer and a condenser, 300 g (0.51 mol) of the obtained polyfluoroalkylphosphonic acid diester of the formula:

$$CF_3(CF_2)(CH_2CF_2)(CF_2CF_2)_2(CH_2CH_2)_2P(O)(OCH_2CH_3)_2 \text{ (97 GC %)}$$

and 300 g of about 35% concentrated hydrochloric acid were charged, and the mixture was stirred at 100° C. for 12 hours. After cooling, filtration under reduced pressure was performed to thereby collect 269 g of solid matters. The solid matters were washed with water and filtrated again, further followed by acetone washing and filtration, thereby obtaining 240 g (0.46 mol; yield: 90%) of the target product.

The results of $^1$H-NMR and $^{19}$F-NMR confirmed that the resulting product was the target compound (polyfluoroalkylphosphonic acid) represented by the following formula:

$$CF_3(CF_2)(CH_2CF_2)(CF_2CF_2)_2(CH_2CH_2)_2P(O)(OH)_2 \quad [IIe]$$

Reference Example 6

(1) In a 1-L four-necked flask equipped with a thermometer and a receiver for removing low-boiling substances, 500 g (1.12 mol) of a compound of the formula:

$$CF_3(CF_2)(CH_2CF_2)(CF_2CF_2)(CH_2CH_2)I \text{ (98 GC %)}$$

and 259 g (2.24 mol) of triethyl phosphite $P(OC_2H_5)_3$ were charged, and the mixture was stirred at 155° C. At this time, to remove the by-product, i.e., ethyl iodide, from the reaction system, nitrogen gas was bubbled into the reaction solution using a small tube. A slight amount of reaction solution was taken and subjected to gas chromatographic analysis to confirm the remaining amount of triethyl phosphite. Thereafter, triethyl phosphite was further added in four batches in an amount of 130 g (1.12 mol) per batch, and the mixture was stirred for 18 hours in total.

After the reaction was completed, the reaction mixture was subjected to simple distillation under reduced pressure at an internal pressure of 0.2 kPa, an internal temperature of 130 to 140° C., and an overhead temperature of 128 to 131° C. The distillate fraction was washed with water, thereby obtaining 405 g (yield: 79%) of a purified reaction product (98 GC %).

The results of $^1$H-NMR and $^{19}$F-NMR confirmed that the resulting purified reaction product was a compound represented by the following formula:

$$CF_3(CF_2)(CH_2CF_2)(CF_2CF_2)(CH_2CH_2)P(O)(OCH_2CH_3)_2.$$

(2) In a 1-L four-necked flask equipped with a thermometer and a condenser, 300 g (0.63 mol) of the obtained polyfluoroalkylphosphonic acid diester of the formula:

$$CF_3(CF_2)(CH_2CF_2)(CF_2CF_2)(CH_2CH_2)P(O)(OCH_2CH_3)_2 \ (94 \ GC\%)$$

and 300 g of about 35% concentrated hydrochloric acid were charged, and the mixture was stirred at 100° C. for 12 hours. After cooling, filtration under reduced pressure was performed to thereby collect 262 g of solid matters. The solid matters were washed with water and filtrated again, further followed by acetone washing and filtration, thereby obtaining 229 g (0.59 mol; yield: 93%) of the target product.

The results of $^1$H-NMR and $^{19}$F-NMR confirmed that the resulting product was the target compound (polyfluoroalkylphosphonic acid) represented by the following formula:

$$CF_3(CF_2)(CH_2CF_2)(CF_2CF_2)(CH_2CH_2)P(O)(OH)_2 \quad \text{[IIf]}$$

Reference Example 7

In a 200-ml reactor equipped with a stirrer and a dropping funnel, 53.2 g of water heated to 40° C. was charged while keeping the water warm, and 5 g (8.4 mmol) of the polyfluoroalkylphosphonic acid [IIa] obtained in Reference Example 1 was added thereto. Then, 15.4 g (12.7 mmol) of an aqueous ammonia solution with a concentration of 1.4 wt. % was added, and stirring was continued for one hour to perform neutralization reaction. As a result, an aqueous solution of polyfluoroalkylphosphonic acid ammonium salt having a pH of 8 (active ingredient concentration: 7.0 wt. %) was obtained [emulsifier aqueous solution I].

The emulsifier aqueous solution I was gradually added in small portions to water, and the surface tension of the aqueous solution was measured. The critical micelle concentration [CMC] of the solution was 0.8 wt. %, and the surface tension at a concentration of 2.0 wt. % was 17 mN/m. The surface tension was measured at 20° C. by the maximum bubble method using a dynamic surface tensiometer (produced by SITA).

Comparative Example 1

In Reference Example 7, when stirring was performed for 1 hour without adding an aqueous ammonia solution to the polyfluoroalkylphosphonic acid [IIa], the polyfluoroalkylphosphonic acid [IIa] added was not dissolved in water and was separated. As a result, no aqueous solution was obtained.

Reference Examples 8 to 12

In Reference Example 7, the amounts of water and aqueous ammonia solution with a concentration of 1.4 wt. % were changed to predetermined amounts, and the same amount (5 g) of each of the polyfluoroalkylphosphonic acids [IIb] to [IIf] respectively obtained in Reference Examples 2 to 6 was used in place of the polyfluoroalkylphosphonic acid [IIa]. Consequently, their aqueous solutions (active ingredient concentration: 7.0 wt. %) were obtained [emulsifier aqueous solutions II to VI].

The surface tension (CMC and surface tension at a concentration of 2.0 wt. %) of the emulsifier aqueous solutions II to VI was measured in the same manner. Table 1 below shows the obtained results, together with the compositions of the emulsifier aqueous solutions. The results of Reference Example 7 are also shown.

TABLE 1

| | Ref. Ex. 7 | Ref. Ex. 8 | Ref. Ex. 9 | Ref. Ex. 10 | Ref. Ex. 11 | Ref. Ex. 12 |
|---|---|---|---|---|---|---|
| [Emulsifier aqueous solution] | | | | | | |
| Symbol | I | II | III | IV | V | VI |
| Phosphonic acid | | | | | | |
| Symbol | IIa | IIb | IIc | IId | IIe | IIf |
| Number of grams | 5 | 5 | 5 | 5 | 5 | 5 |
| Number of mmols | 8.4 | 10.2 | 8.4 | 10.2 | 9.6 | 17.1 |
| Aqueous ammonia solution | | | | | | |
| Number of grams | 15.4 | 18.5 | 15.4 | 13.8 | 15.7 | 23.2 |
| Number of mmols | 12.7 | 15.2 | 12.7 | 15.2 | 14.4 | 25.7 |
| Water | | | | | | |
| Number of grams | 53.2 | 50.5 | 53.2 | 55.2 | 53.3 | 47.6 |

TABLE 1-continued

| | Ref. Ex. 7 | Ref. Ex. 8 | Ref. Ex. 9 | Ref. Ex. 10 | Ref. Ex. 11 | Ref. Ex. 12 |
|---|---|---|---|---|---|---|
| [Surface tension] | | | | | | |
| CMC (wt %) | 0.8 | 0.8 | 0.8 | 1.0 | 0.9 | 1.2 |
| Surface tension at 2% concentration (mN/m) | 17.0 | 16.8 | 16.9 | 18.2 | 18.5 | 19.0 |

Reference Example 13

In Reference Example 7, the amount of water was changed to 66.4 g, and 5 g (11.6 mmol) of pentadecafluorooctanoic acid ammonium salt $C_7F_{15}COONH_4$ (EFTOP EF204, produced by Jemco Co., Ltd.) was used in place of the polyfluoroalkylphosphonic acid [IIa] and aqueous ammonia solution, thereby obtaining an aqueous solution thereof (active ingredient concentration: 7.0 wt. %) [emulsifier aqueous solution VII].

Example 1

In a stainless steel pressure reactor with an inner capacity of 10 L equipped with a stirrer, the following components were charged:
Water: 2,911 g
Emulsifier aqueous solution I: 472 g
NaOH: 1.3 g
Ethyl malonate: 12.0 g.
After the air in the reactor was replaced by nitrogen gas, a gas mixture of the following composition:
Vinylidene fluoride [VdF]: 435 g (83 mol %)
Tetrafluoroethylene [TFE]: 45 g (6 mol %)
Hexafluoropropylene [HFP]: 135 g (11 mol %)
was charged as the initial charge gas (total: 615 g), and the internal temperature of the reactor was raised to 80° C. As a result, the internal pressure was about 2.4 MPa·G.

Subsequently, a polymerization initiator aqueous solution prepared by dissolving 2.5 g of ammonium persulfate in 150 g of water (total amount of water: 3,061 g) was press-charged into the reactor to initiate the polymerization reaction. After the initiation of the polymerization reaction, 2,500 g (VdF/TFE/HFP=1,980/200/320 g) of a VdF/TFE/HFP (88/6/6 mol %) gas mixture was further added in batches (total amount charged: 3,115 g) so that the internal pressure was 2.35 to 2.45 MPa·G to maintain the pressure in the reactor.

After the further addition in batches was completed, aging was performed until the internal pressure of the pressure reactor (autoclave) was 0.5 MPa·G. The resultant was cooled to room temperature to terminate the polymerization reaction, thereby obtaining 6,420 g (recovery rate based on the total amount charged (6,663.8 g): 96.3%) of emulsion A (solid matters content: 45.2 wt. %).

The average particle diameter of the emulsion A measured by a dynamic light-scattering method using a particle size distribution analyzer (Microtrac UPA150, produced by Nikkiso Co. Ltd.) was 115 nm. When the average particle diameter of the emulsion A was measured after being left for one month at room temperature and 40° C., the results were 118 nm (increase rate: 3%) and 120 nm (increase rate: 4%), respectively. It was thus confirmed that the formed emulsion was stable. Further, as for the mechanical stability of the aqueous dispersion, the aqueous dispersion was passed through a 325-mesh metal sieve 10 times, and the average particle diameter of the aqueous dispersion was measured. The result was 125 nm (increase rate: 9%). It was thus confirmed that the emulsion was stable. The increase rate of the average particle diameter was calculated by the following formula:

Increase rate=(average particle diameter after test−initial average particle diameter)/initial average particle diameter×100(%)

The obtained emulsion A was added dropwise to a 0.5 wt. % calcium chloride aqueous solution while stirring. The coagulated product was separated by filtration, and sufficiently washed with ion exchange water under stirring, followed by filtration and drying. As a result, 1,995 g (polymerization rate: 95%) of a white powdery fluorine-containing copolymer was obtained. The copolymerization composition of the fluorine-containing copolymer determined by $^{19}$F-NMR was VdF/TFE/HFP=88/6/6 (mol %). In addition, a 1 wt./vol. % methyl ethyl ketone solution of the fluorine-containing copolymer was prepared. The solution viscosity η sp/c measured at 35° C. was 1.2 g/dl.

Examples 2 to 6 and Comparative Example 2

In Example 1, the same amount (472 g) of each of the emulsifier aqueous solutions II to VII was used in place of the emulsifier aqueous solution I. The recovery amount, recovery rate, solid matters content, various average particle diameters, and increase rate of the average particle diameter of the obtained emulsions B to F and a were measured in the same manner as in Example 1. Table 2 below shows the obtained results. The results of Example 1 are also shown.

TABLE 2

| | Ex. 1 | Ex. 2 | Ex. 3 | Ex. 4 | Ex. 5 | Ex. 6 | Comp. Ex. 2 |
|---|---|---|---|---|---|---|---|
| [Emulsifier aqueous solution] | | | | | | | |
| Symbol | I | II | III | IV | V | VI | VII |
| [Emulsion] | | | | | | | |
| Symbol | A | B | C | D | E | F | a |
| Recovery amount (g) | 6420 | 6415 | 6422 | 6415 | 6413 | 6420 | 6425 |

TABLE 2-continued

|  | Ex. 1 | Ex. 2 | Ex. 3 | Ex. 4 | Ex. 5 | Ex. 6 | Comp. Ex. 2 |
|---|---|---|---|---|---|---|---|
| Solid matters content (wt. %) | 45.2 | 45.1 | 45.0 | 45.5 | 45.6 | 44.9 | 45.5 |
| Recovery rate (%) | 96.3 | 96.3 | 96.4 | 96.3 | 96.2 | 96.3 | 96.4 |
| [Average particle diameter] | | | | | | | |
| Initial (nm) | 115 | 110 | 107 | 125 | 120 | 130 | 115 |
| After one month at room temp. (nm) | 118 | 112 | 110 | 130 | 122 | 135 | 120 |
| Increase rate (%) | 3 | 2 | 3 | 4 | 2 | 4 | 4 |
| After one month at 40° C. (nm) | 120 | 115 | 113 | 135 | 126 | 140 | 125 |
| Increase rate (%) | 4 | 5 | 6 | 8 | 5 | 8 | 9 |
| After filtration (nm) | 125 | 117 | 115 | 139 | 130 | 145 | 132 |
| Increase rate (%) | 9 | 6 | 7 | 11 | 8 | 12 | 15 |

Example 7

In a stainless steel pressure reactor with an inner capacity of 10 L equipped with a stirrer, the following components were charged:
Ion exchange water: 4,500 g
Emulsifier aqueous solution I: 250 g
$Na_2HPO_4 \cdot 12H_2O$: 15 g
Ethyl malonate: 1.8 g.
After the air in the reactor was replaced by nitrogen gas, a gas mixture of the following composition:
Vinylidene fluoride [VdF]: 180 g (69 mol %)
Tetrafluoroethylene [TFE]: 126 g (31 mol %)
was charged as the initial charge gas (total: 306 g), and the internal temperature of the reactor was raised to 80° C. As a result, the internal pressure was about 2.1 MPa·G.

Subsequently, a polymerization initiator aqueous solution prepared by dissolving 3.0 g of ammonium persulfate in 150 g of water (total amount of water: 4,650 g) was press-charged into the reactor to initiate the polymerization reaction. After the initiation of the polymerization reaction, 1,230 g (VdF/TFE=723/507 g) of a VdF/TFE (69/31 mol %) gas mixture was further added in batches (total amount charged: 1,536 g), so that the internal pressure was 2.0 to 2.1 MPa·G to maintain the pressure in the reactor.

After the further addition in batches was completed, aging was performed until the internal pressure of the pressure reactor (autoclave) was 0.5 MPa·G. The resultant was cooled to room temperature to terminate the polymerization reaction, thereby obtaining 6,200 g (recovery rate based on the total amount charged (6,455.8 g): 96.0%) of emulsion G (solid matters content: 23.2 wt. %).

The various average particle diameters and increase rate of the average particle diameter of the emulsion G were measured in the same manner as in Example 1.

The copolymer was separated from the obtained emulsion G in the same manner as in Example 1, thereby obtaining 1,330 g (polymerization rate: 87%) of a white powdery fluorine-containing copolymer. The copolymerization composition of the fluorine-containing copolymer determined by $^{19}$F-NMR and FT-IR was VdF/TFE=70/30 (mol %). In addition, the weight average molecular weight (Mw) was measured as follows: Using Shodex GPC KD806 M+KD-802+KD-G, GPC measurement was carried out with 10 mmol LiBr/dimethylformamide as an eluate at a temperature of 50° C. at an elution rate of 0.5 ml/min. The detector used was a differential refractometer, and the analysis was conducted using an SIC Labchart 180. The measured weight average molecular weight (Mw) was 460,000. Further, the melting point was measured as follows: Using DSC220C (produced by Seiko Instruments Inc.), heating and cooling of the sample was repeated with a temperature program in which the sample was heated from 30° C. to 250° C. at a heating rate of 10° C./min, then cooled to 30° C. at a cooling rate of 10° C./min, and heated again to 250° C. at a heating rate of 10° C./min. The temperature of the exothermic peak measured at that time was 140° C.

Example 8

In a stainless steel pressure reactor with an inner capacity of 10 L equipped with a stirrer, the following components were charged:
Ion exchange water: 4,950 g
Emulsifier aqueous solution I: 720 g
$Na_2HPO_4 \cdot 12H_2O$: 3.4 g
Methanol: 5 g.
After the air in the reactor was replaced by nitrogen gas, a gas mixture of the following composition:
Tetrafluoroethylene [TFE]: 130 g (52 mol %)
Perfluoro(ethyl vinyl ether) [FEVE]: 260 g (48 mol %)
was charged as the initial charge gas (total: 390 g), and the internal temperature of the reactor was raised to 80° C. As a result, the internal pressure was about 2.1 MPa·G.

Subsequently, a polymerization initiator aqueous solution prepared by dissolving 3.4 g of ammonium persulfate and 0.5 g of $NaHSO_3$ in 150 g of water (total amount of water: 5,100 g) was press-charged into the reactor to initiate the polymerization reaction. After the initiation of the polymerization reaction, 1,620 g (VdF/FEVE=1,000/620 g) of a TFE/FEVE (78/22 mol %) gas mixture was further added in batches (total amount charged: 2,010 g), so that the internal pressure was 0.78 to 0.85 MPa·G to maintain the pressure in the reactor.

After the further addition in batches was completed, aging was performed until the internal pressure of the pressure reactor (autoclave) was 0.5 MPa·G. The resultant was cooled to room temperature to terminate the polymerization reaction, thereby obtaining 7,250 g (recovery rate based on the total amount charged (7,842.3 g): 92.4%) of emulsion H (solid matters content: 20.1 wt. %).

The various average particle diameters and increase rate of the average particle diameter of the emulsion H were measured in the same manner as in Example 1.

The copolymer was separated from the obtained emulsion H in the same manner as in Example 1, thereby obtaining 1,320 g (polymerization rate: 66%) of a white powdery fluorine-containing copolymer. The copolymerization composition of the fluorine-containing copolymer determined by $^{19}$F-NMR and FT-IR was TFE/FEVE=82/18 (mol %).

Example 9

In a stainless steel pressure reactor with an inner capacity of 10 L equipped with a stirrer, the following components were charged:
Ion exchange water: 4,835 g
Emulsifier aqueous solution I: 285 g
Na$_2$HPO$_4$.12H$_2$O: 20 g
Ethyl malonate: 2.6 g
1,4-diiodoperfluorobutane I(CF$_2$)$_4$I: 20 g.

After the air in the reactor was replaced by nitrogen gas, a gas mixture of the following composition:
Vinylidene fluoride [VdF]: 183 g (32 mol %)
Tetrafluoroethylene [TFE]: 105 g (12 mol %)
Hexafluoropropylene [HFP]: 750 g (56 mol %)
was charged as the initial charge gas (total: 1,038 g), and the internal temperature of the reactor was raised to 70° C. As a result, the internal pressure was about 3.1 MPa·G.

Subsequently, a polymerization initiator aqueous solution prepared by dissolving 0.5 g of ammonium persulfate in 100 g of water (total amount of water: 4,935 g) was press-charged into the reactor to initiate the polymerization reaction. After the initiation of the polymerization reaction, 1,872 g (VdF/TFE/HFP=679/434/759 g) of a VdF/TFE/HFP (53.0/21.7/25.3 mol %) gas mixture was further added in batches (total amount charged: 2,910 g), so that the internal pressure was 2.9 to 3.0 MPa·G to maintain the pressure in the reactor.

After the further addition in batches was completed, aging was performed until the internal pressure of the pressure reactor (autoclave) was 1.7 MPa·G. The resultant was cooled to room temperature to terminate the polymerization reaction, thereby obtaining 7,800 g (recovery rate based on the total amount charged (8,173.1 g): 95.4%) of emulsion I (solid matters content: 35.2 wt. %).

The various average particle diameters and increase rate of the average particle diameter of the emulsion I were measured in the same manner as in Example 1.

The copolymer was separated from the obtained emulsion I in the same manner as in Example 1, thereby obtaining 2,440 g (polymerization rate: 84%) of a white powdery fluorine-containing copolymer. The copolymerization composition of the fluorine-containing copolymer determined by $^{19}$F-NMR and FT-IR was VdF/TFE/HFP=67/16/17 (mol %). Furthermore, the value of η sp/c (1 wt./vol. % methyl ethyl ketone solution, 35° C.) was 1.2 dl/g.

Table 3 below shows the various average particle diameters and increase rate of the average particle diameter of the emulsions obtained in Examples 7 to 9.

TABLE 3

| Average particle diameter | Ex. 7 | Ex. 8 | Ex. 9 |
|---|---|---|---|
| Initial (nm) | 120 | 109 | 125 |
| After one month at room temp. (nm) | 122 | 110 | 125 |
| Increase rate (%) | 2 | 1 | 0 |
| After one month at 40° C. (nm) | 125 | 110 | 126 |
| Increase rate (%) | 4 | 1 | 1 |
| After filtration (nm) | 130 | 120 | 133 |
| Increase rate (%) | 8 | 10 | 6 |

Reference Example 14

Terpolymer obtained in Example 9: 100 parts by weight
MT carbon black: 20 parts by weight
ZnO: 5 parts by weight
Triallyl isocyanurate (TRIC M60, produced by Nippon Kasei Chemical Co., Ltd.): 5 parts by weight
Organic peroxide (Perhexa 25B, produced by NOF Corporation): 3.5 parts by weight The above components were kneaded using an 8-inch open roll. The kneaded product was subjected to press vulcanization at 180° C. for 10 minutes, followed by oven vulcanization (secondary vulcanization) at 230° C. for 22 hours.

Various properties of the vulcanizate were measured, and the following results were obtained. Compression set was measured for a P-24 O ring according to ASTM Method B.
100% modulus: 4.3 MPa
Elongation at break: 220%
Strength at break: 18.2 MPa
Compression set
 150° C., 70 hours: 9%
 200° C., 70 hours: 23%
 230° C., 70 hours: 40%

The invention claimed is:

1. A fluorine-containing polymer aqueous dispersion in which a fluorine-containing polymer is dispersed using, as an emulsifier, a polyfluoroalkylphosphonic acid salt represented by the general formula:

$$C_nF_{2n+1}(CH_2CF_2)_a(CF_2CF_2)_b(CH_2CH_2)_cP(O)(OM^1)(OM^2)$$ [I]

wherein $M^1$ is a hydrogen atom, an alkali metal, an ammonium base, or an organic amine base, $M^2$ is an alkali metal, an ammonium base, or an organic amine base, n is an integer of 1 to 6, a is an integer of 1 to 4, b is an integer of 1 to 3, and c is an integer of 1 to 3.

2. The fluorine-containing polymer aqueous dispersion according to claim 1, wherein the polyfluoroalkylphosphonic acid salt is an ammonium salt.

3. The fluorine-containing polymer aqueous dispersion according to claim 1, which is obtained by emulsion polymerization of the fluorine-containing monomer in the presence of an aqueous solution of the polyfluoroalkylphosphonic acid salt emulsifier represented by the general formula [I].

4. A method for producing a fluorine-containing polymer, the method comprising subjecting a product obtained by coagulating the fluorine-containing polymer aqueous dispersion according to claim 3 to filtration, water washing and drying.

5. The method for producing a fluorine-containing polymer according to claim 4, wherein the coagulation is carried out by salting-out.

* * * * *